(12) United States Patent
Orias

(10) Patent No.: US 7,965,313 B2
(45) Date of Patent: Jun. 21, 2011

(54) AIRPORT SECURITY SYSTEM

(75) Inventor: Geoffrey Orias, Laguna Beach, CA (US)

(73) Assignee: The Boeing Company, Chicago, IL (US)

( * ) Notice: Subject to any disclaimer, the term of this patent is extended or adjusted under 35 U.S.C. 154(b) by 1350 days.

(21) Appl. No.: 10/906,757

(22) Filed: Mar. 4, 2005

(65) Prior Publication Data
US 2006/0197836 A1    Sep. 7, 2006

(51) Int. Cl.
*H04N 7/12* (2006.01)
(52) U.S. Cl. ........ 348/143; 348/150; 348/151; 348/152; 348/153; 348/154; 348/155; 348/156; 348/159
(58) Field of Classification Search .................. 348/143, 348/150–156, 159
See application file for complete search history.

(56) References Cited

U.S. PATENT DOCUMENTS

| | | | |
|---|---|---|---|
| 6,057,761 A | 5/2000 | Yukl | |
| 6,137,895 A | 10/2000 | Al-Sheikh | |
| 6,424,370 B1 * | 7/2002 | Courtney | 348/143 |
| 6,674,367 B2 | 1/2004 | Sweatte | |
| 6,690,374 B2 * | 2/2004 | Park et al. | 345/427 |
| 6,698,653 B1 | 3/2004 | Diamond | |
| 7,450,735 B1 * | 11/2008 | Shah et al. | 382/103 |
| 7,606,425 B2 * | 10/2009 | Bazakos et al. | 382/224 |

* cited by examiner

*Primary Examiner* — Joseph G Ustaris
*Assistant Examiner* — Geepy Pe
(74) *Attorney, Agent, or Firm* — Ostrager Chong Flaherty & Broitman P.C.

(57) ABSTRACT

An airport security system includes a scanner scanning and time stamping an article of identification of an individual passing into a secure terminal area. The system further includes security cameras generating respective video signals of overlapping zones of coverage of the secure terminal area. The video signals are recorded and received in a controller generating a seamless video signal therefrom. Reversing of the seamless video signal allows visual tracking of a security breach in the secure terminal area from the time of breach identification scan and time stamp. Faster than real time forwarding of the seamless video signal allows tracking of the security breach from the time stamp to the breacher's present location within the secure terminal area.

15 Claims, 1 Drawing Sheet

AIRPORT SECURITY SYSTEM

GOVERNMENT CONTRACT

This invention was made with Government support under contract number N00024-00-C-6103 awarded by the U.S. Navy. The government has certain rights in this invention.

TECHNICAL FIELD

The present invention relates generally to security systems, and more particularly to a security system in an aircraft terminal.

It is a constant goal in the field of security technology to improve airport terminal security. A problem often arises that an individual crossing through security checkpoints inadvertently (and often innocently) is permitted through with something they are not allowed to take into the secure area. The procedures for dealing with these types of situations are relatively expensive and include at least some of the following: evacuating the airport terminal, evacuating a flight, or re-screening passengers. The item and person is rarely, if ever, found, whereas flights are delayed and passengers are inconvenienced. The cost of such an event is often in the hundreds of thousands if not millions of dollars.

To avoid evacuating the entire airport terminal, security must do at least one of the following: find the person who breeched security, retrieve the banned item, verify that the occurrence was, in fact, not a breech of security, or verify that the person did not pass the item off to someone else or conceal it somewhere in the airport.

Often is the case that even though the security personnel review identification cards of everyone entering the screening area, they have no idea who these people are after they leave the screening area because the identification information is not recorded.

A further problem occurs in airport terminals because of lack of sufficient camera overlap such that although most terminals include many cameras, the cameras often do not have the desired overlap in field of view. This overlap would allow tracking of a person from camera to camera and allow a security breech to be traced back to its origin.

The disadvantages associated with current airport security systems made it apparent that a new technique for tracking potential security violations from security checkpoints is needed. The new technique should record data of people passing through the checkpoints and should also have sufficient camera overlap for tracking of the potential security breech.

SUMMARY OF THE INVENTION

According to one embodiment of the present invention, an airport security checkpoint system includes a scanner scanning and time stamping an article of identification of an individual passing into a secure terminal area. The system further includes first and second security cameras generating respective first and second video signals of first and second overlapping zones of coverage of the secure terminal area. The first video signal is recorded on a first recorder. The second video signal is recorded on a second recorder. The video signals are received in a controller generating a seamless video signal therefrom, whereby an indication of a security breach by the individual in the secure terminal area is tracked from the breach to the time stamp through reversing the seamless video signal.

According to another embodiment of the present invention, a method for operating an airport security system covering a secure terminal area includes generating overlapping images of the secure terminal area with a plurality of security cameras. The method further includes recording first identification information of a first individual entering the secure terminal area and time stamping the first identification information. Images of the first individual passing from the first one of the plurality of cameras to the second one of the plurality of cameras are recorded. A path of the first individual is retraced through the secure terminal area from the time stamping of the first identification information to real-time through reviewing the images.

One advantage of the present invention is that it generates a seamless video image that can be traced back to a time stamp for rapidly identifying a security violator.

Another advantage is that airport terminals having the present security system may avoid evacuations and thereby avoid large expenditures of money for rescheduled flights, passenger inconveniences, and unnecessary security searches.

Additional advantages and features of the present invention will become apparent from the description that follows and may be realized by the instrumentalities and combinations particularly pointed out in the appended claims, taken in conjunction with the accompanying drawings.

BRIEF DESCRIPTION OF THE DRAWINGS

For a complete understanding of the invention, there will now be described some embodiments thereof, given by way of example, reference being made to the accompanying drawings, in which.

DETAILED DESCRIPTION

Figure 1:
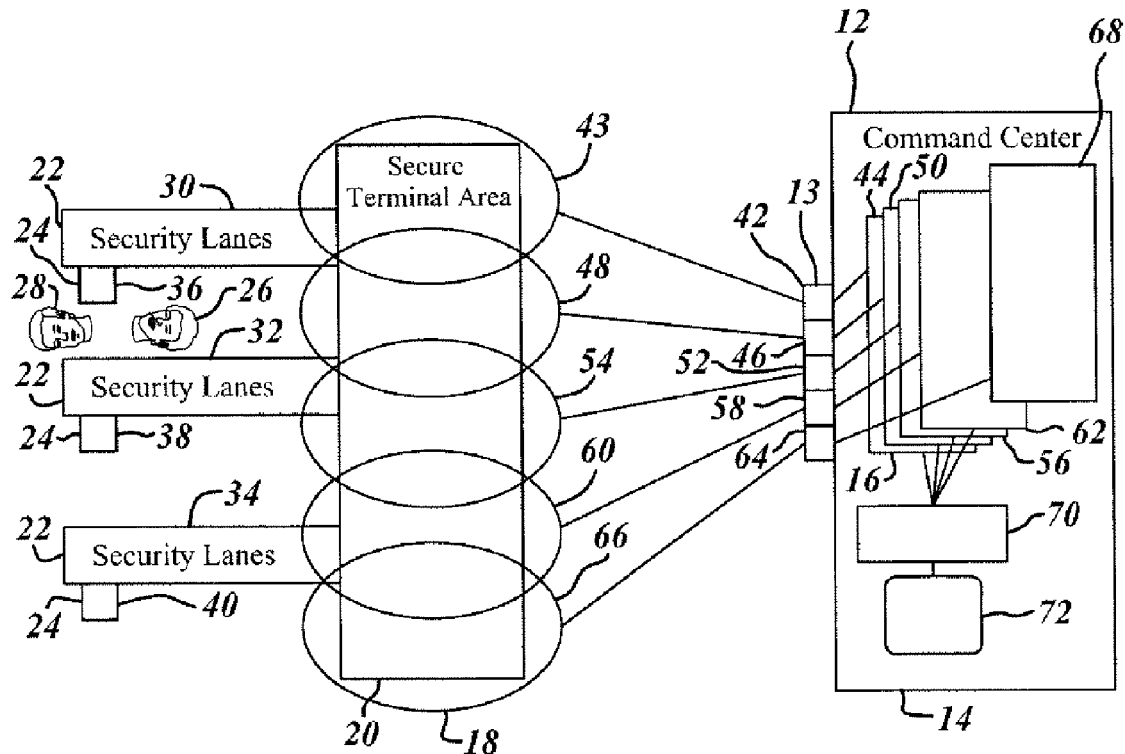
FIG. 1 is a schematic diagram of an airport security system in accordance with one embodiment of the present invention.

The present invention is illustrated with respect to a security system, particularly suited to the field of airport security. The present invention is, however, applicable to various other uses that may require security systems, such as office buildings, banks, political event locations, and other locations or situations involving high traffic of people through a security checkpoint, as will be understood by one skilled in the art. In each of the following figures, the same reference numerals are used to refer to the same components.

Referring to FIG. 1, an airport security checkpoint system 10 including a security control system 12 is illustrated in accordance with one embodiment of the present invention. The airport security checkpoint system 10 includes a command center 14 having a controller 70 and a plurality of digital recorders 16 coupled to a plurality of digital cameras 15 having collective fields of view 18 covering a secure terminal area 20. The secure terminal area 20 is adjacent to a plurality of security lanes 22 each having a respective ID reader or scanner 24. Further illustrated in FIG. 1 is a security officer 26 screening an individual 28 at the security lanes 22.

Each of the security lanes 22, (here embodied as three: first security lane 30, second security lane 32, third security lane 34), includes a respective ID reader or scanner (first scanner 36, second scanner 38, third scanner 40). The security lanes 22 are embodied as typical security lanes and may include such things as metal detectors or x-ray machines. The security lanes 22 feed into the secure terminal area 20, which is here represented as a rectangular block intended to be a typical secure airport terminal area.

Each identification (ID) reader or scanner 24 reads an article of identification, such as the names of people 28 entering the security lanes 22, off their drivers license or passport. Alternately, a scanner or digital camera snaps a digital photograph of the ID as it is presented. All scans or photographs will include a time stamp such that information is recorded of who entered and at what time. In other embodiments, the scanner 24 scans boarding passes or other scannable articles including biological identifiers, such as retinas and fingerprints.

At this stage in the security process, if a breech occurs it may be narrowed down to a few individuals that can be asked to return to the security checkpoint 10.

The system 10 further includes a network or plurality of cameras 13 having overlapping viewing areas of the secure terminal area 20. Each of the plurality of cameras is coupled to at least one digital recorder 16 recording images from the cameras 13. In other words, a first digital camera 42 generates signals covering a first zone of coverage 43 received in a first digital recorder 44; a second digital camera 46 generates signals of the second zone of coverage 48 that are then received in the second digital recorder 50; the third digital camera 52 receives signals from the third zone of coverage 54 that are then received in the third digital recorder 56; the fourth digital camera 58 receives signals from the fourth zone of coverage 60 that are then received in the fourth digital recorder 62; the fifth digital camera 64 receives signals from the fifth zone of coverage 66 that are then received in the fifth digital recorder 68.

Signals from the digital recorders 16 and cameras 13 are received in the controller 70 that may include applications, such as automatic "fly-to" software or image recognition software, assisting in tracking a person from camera to camera. The controller 70 may be coupled to a user interface 72 including a monitor.

The system 10 provides a method for integrating overlapping video surveillance cameras 13 with video management software in the controller 70 for switching between camera views for aiding in the tracking of suspected individuals. This allows generation of a complete record of individuals passing through security checkpoints.

The system 10 incorporates a method for recording the video and playing back of the video with seamless switching between different camera recordings in a faster than real-time order, such that security personnel using the user interface 72 may catch up with a suspected individual. In other words, the security personnel detect a security breach and rewind film from all the cameras for tracking the individual or individuals (e.g. first individual and second individual) responsible back to that individual's point of entry into the secure area 20. The identification time stamp may be then used to identify the individual. For example, the individual's whereabouts and activities may be determined through forwarding the film from the plurality of cameras 13.

In an alternate embodiment of the present invention, the controller 70 includes image recognition software, such that the controller automatically tracks the individual to the point of entry or time stamp and automatically provides security personnel with identification information and current whereabouts information.

Figure 2:
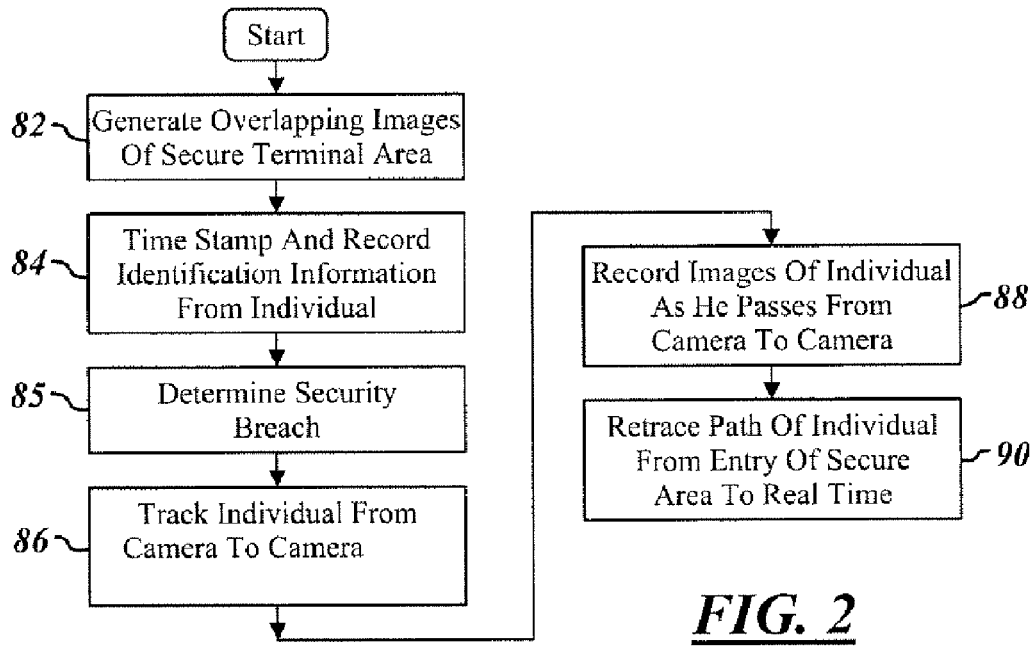
FIG. 2 is a logic flow diagram illustrating operations of the system of FIG. 1 in accordance with another embodiment of the present invention.

Referring to FIG. 2, a logic flow diagram 80 of a method for operating a security system, in accordance with another embodiment of the present invention, is illustrated. Logic starts in operation block 82 where the cameras generate overlapping images of the secure terminal area.

In operation block 84 an individual enters the secure terminal area through the security lanes by providing identification information, which is recorded and time stamped.

In operation block 85, a security breach is detected by security personnel.

In operation block 86 the individual responsible for the security breach is tracked from camera to camera by rewinding the film of the cameras or through tracking software in the controller.

In operation block 88 images are recorded of the individual passing from camera to camera for use as evidence of security breach.

In operation block 90 the path of the individual through the secure terminal area is retraced from the moment and point of entry to real-time.

From the foregoing, it can be seen that there has been brought to the art a new security system. It is to be understood that the preceding description of one embodiment of the present invention is merely illustrative of some of the many specific embodiments that represent applications of the principals of the present invention. Numerous and other arrangements would be evident to those skilled in the art without departing from the scope of the invention as defined by the following claims.

What is claimed is:

1. An airport security system for identifying and locating a passenger who commits a security breach within a secure terminal area, comprising: a scanner scanning articles of identification of passengers entering the secure terminal area and generating a time stamp signal for each of said articles of identification; a plurality of security cameras positioned in sequence throughout the secure terminal area to view the passengers, said plurality of security cameras having adjacent and overlapping viewing areas covering substantially the entire secure terminal area, each camera in said plurality of security cameras generating a video signal corresponding to its viewing area; a plurality of recorders, each of said recorders generating a video recording of the video signal from a different camera in the plurality of security cameras; and a controller programmed to: generate a seamless video signal of a suspect passenger by stitching recordings from different cameras together in sequence into a single video stream as the image of the suspect passenger passes through recordings from different cameras, visually track an image of said suspect passenger back in time through the seamless video signal of said suspect passenger until an earliest recording of the suspect passenger is found, generate a faster than real-time video sequence of the suspect passenger which terminates with a recording of the suspect passenger's current location, and identify the time stamp signal associated with the earliest recording of the suspect passenger.

2. The system of claim 1, wherein said controller further comprises object recognition software recognizing said suspect passenger.

3. The system of claim 2, wherein said controller stores image recognition data of said suspect passenger and scans said image recognition data in response to said security breach.

4. The system of claim 3, wherein said controller automatically scans said image recognition data from said time stamp to real-time and generates a real-time signal of said suspect passenger.

5. The system of claim 3, wherein said controller generates an automatic fly-to signal on a monitor of said suspect passenger's real-time whereabouts.

6. The system of claim 1, wherein said article of identification comprises at least one of a driver's license, a state ID, a passport, a boarding pass, and a biological identifier.

7. A method for operating an airport security system covering a secure terminal area comprising: scanning, with a scanner, articles of identification of passengers entering the secure terminal area; generating a time stamp signal for each of said articles of identification; generating and recording overlapping images of the secure terminal area with a plurality of security cameras positioned in sequence throughout the secure terminal area, said plurality of security cameras having adjacent and overlapping viewing areas covering substantially the entire secure terminal area; generating a seamless video signal of a suspect passenger by stitching recordings from different cameras together in sequence into a single-video stream as the image of the suspect passenger passes through recordings from different cameras; visually tracking an image of the suspect passenger back in time through the seamless video signal of said suspect passenger until an earliest recording of the suspect passenger is found; generating a faster than real-time video sequence of the suspect passenger which terminates with a recording of the suspect passenger's current location; and identifying the time stamp signal associated with the earliest recording of the suspect passenger.

8. The method of claim 7 further comprising tracking said first individual from a first one of said plurality of cameras to a second one of said plurality of cameras with a tracking software.

9. The method of claim 7 further comprising recording second identification information of a second individual entering the secure terminal area; and
time stamping said second identification information.

10. The method of claim 7 further comprising automatically flying to said time stamping of said first identification information and said real-time.

11. The method of claim 7 further comprising generating a seamless image of first individual passing from said first one of said plurality of cameras to said second one of said plurality of cameras.

12. The method of claim 11, wherein retracing comprises reversing said seamless image through a manual interface.

13. The method of claim 7, wherein retracing comprises recognizing an image of said first individual through image recognition software.

14. The system of claim 1, wherein:
the earliest recording of the suspect passenger is the recording of the suspect passenger when entering the secure terminal area.

15. The system of claim 1, wherein:
the controller is further programmed to:
identify the article of identification associated with the identified time stamp signal, and
obtain a passenger identity from the article of identification associated with the identified time stamp signal.

* * * * *